United States Patent
Okawa et al.

(10) Patent No.: US 9,030,786 B2
(45) Date of Patent: May 12, 2015

(54) MAGNETIC HEAD HAVING A SOFT MAGNETIC LAYER WITH A CLOSE-PACKED PLANE THEREOF BEING PARALLEL OR OBLIQUE TO AN AIR BEARING SURFACE

(71) Applicant: HGST Netherlands B.V., Amsterdam (NL)

(72) Inventors: Norihiro Okawa, Odawara (JP); Kouji Okazaki, Odawara (JP)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 13/949,126

(22) Filed: Jul. 23, 2013

(65) Prior Publication Data

US 2015/0029610 A1 Jan. 29, 2015

(51) Int. Cl.
G11B 5/39 (2006.01)

(52) U.S. Cl.
CPC .................................. G11B 5/3909 (2013.01)

(58) Field of Classification Search
USPC .................................................... 360/324.12
See application file for complete search history.

(56) References Cited

U.S. PATENT DOCUMENTS

| | | | |
|---|---|---|---|
| 6,943,993 B2 | 9/2005 | Chang et al. | |
| 7,333,304 B2 | 2/2008 | Gill et al. | |
| 7,426,096 B2 | 9/2008 | Shimazawa et al. | |
| 7,446,979 B2 | 11/2008 | Jayasekara | |
| 7,466,525 B2* | 12/2008 | Hasegawa et al. | 360/324.12 |
| 7,505,232 B2 | 3/2009 | Haginoya et al. | |
| 7,599,151 B2 | 10/2009 | Hatatani et al. | |
| 7,879,466 B2* | 2/2011 | Takahashi et al. | 428/829 |
| 8,154,828 B2* | 4/2012 | Tsuchiya et al. | 360/324.12 |
| 8,339,753 B1 | 12/2012 | Okawa et al. | |
| 2005/0225907 A1* | 10/2005 | Hoshiya et al. | 360/324.12 |
| 2009/0034132 A1* | 2/2009 | Miyauchi et al. | 360/324 |
| 2009/0080120 A1* | 3/2009 | Funayama et al. | 360/319 |
| 2012/0087046 A1* | 4/2012 | Yanagisawa et al. | 360/294 |
| 2012/0250189 A1* | 10/2012 | Degawa et al. | 360/235.4 |

FOREIGN PATENT DOCUMENTS

EP 0333347 B1 11/1996

OTHER PUBLICATIONS

Kanai et al., "Spin-valve sensors with domain control hard magnet layers," 1995 IEEE, IEEE Transactions on Magnetics, vol. 31, No. 6, Nov. 1995, pp. 2612-2614.

* cited by examiner

*Primary Examiner* — Mark Blouin
(74) *Attorney, Agent, or Firm* — Zilka-Kotab, PC

(57) ABSTRACT

In one embodiment, a magnetic head includes a magnetoresistive sensor having a free layer and a soft magnetic layer adapted to control a magnetization direction of the free layer and a magnetic domain of the free layer, wherein a close-packed plane of the soft magnetic layer is positioned parallel to an air bearing surface (ABS) of the magnetic head. In another embodiment, a method for forming a magnetic head includes forming a magnetoresistive sensor having a free layer above a substrate and forming a soft magnetic layer adapted to control a magnetization direction of the free layer and a magnetic domain of the free layer, wherein a close-packed plane of the soft magnetic layer is positioned parallel or oblique to an ABS of the magnetic head.

25 Claims, 10 Drawing Sheets

MAGNETIC HEAD HAVING A SOFT MAGNETIC LAYER WITH A CLOSE-PACKED PLANE THEREOF BEING PARALLEL OR OBLIQUE TO AN AIR BEARING SURFACE

FIELD OF THE INVENTION

The present invention relates to a magnetic head for reading from and/or writing to a magnetic recording medium, and more specifically to a soft magnetic layer of a magnetic head which has a close-packed plane that is parallel or oblique to an air bearing surface (ABS) of the magnetic head.

BACKGROUND

Conventionally, tunneling magnetoresistive (TMR) sensors are provided with a free layer and a side shield positioned on at least one end of the free layer in a cross-track direction. The side shield has a structure in which a bias field is applied to the free layer. The free layer forms a single magnetic domain as a result of the bias field and noise is suppressed. If the free layer does not form a single magnetic domain and magnetic domains are present, noise, such as Barkhausen noise, is produced.

In a conventional TMR head structure according to the prior art, as shown in FIG. 1, the close-packed plane 106 of the side shield 104 has a small anisotropic field, Hk, perpendicular to the air bearing surface (ABS) 108. The close packed plane 106 is only shown on one side of the side shield 104 to avoid confusion, but the entire side shield 104 is characterized by this close packed plane 106 orientation. This perpendicular orientation acts to reduce the bias field being applied to the free layer of the sensor 102. As a result, noise is generated which reduces the signal-to-noise ratio (SNR) of the TMR head 100. This is undesirable.

SUMMARY

In one embodiment, a magnetic head includes a magnetoresistive sensor having a free layer and a soft magnetic layer adapted to control a magnetization direction of the free layer and a magnetic domain of the free layer, wherein a close-packed plane of the soft magnetic layer is positioned parallel to an air bearing surface (ABS) of the magnetic head.

According to another embodiment, a magnetic head includes a magnetoresistive sensor having a free layer and a soft magnetic layer adapted to control a magnetization direction of the free layer and a magnetic domain of the free layer, wherein a close-packed plane of the soft magnetic layer is positioned oblique to an ABS of the magnetic head.

In another embodiment, a method for forming a magnetic head includes forming a magnetoresistive sensor having a free layer above a substrate and forming a soft magnetic layer adapted to control a magnetization direction of the free layer and a magnetic domain of the free layer, wherein a close-packed plane of the soft magnetic layer is positioned parallel or oblique to an ABS of the magnetic head.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic head includes a magnetoresistive sensor having a free layer and a soft magnetic layer adapted to control a magnetization direction of the free layer and a magnetic domain of the free layer, wherein a close-packed plane of the soft magnetic layer is positioned parallel to an air bearing surface (ABS) of the magnetic head.

According to another general embodiment, a magnetic head includes a magnetoresistive sensor having a free layer and a soft magnetic layer adapted to control a magnetization direction of the free layer and a magnetic domain of the free layer, wherein a close-packed plane of the soft magnetic layer is positioned oblique to an ABS of the magnetic head.

In another general embodiment, a method for forming a magnetic head includes forming a magnetoresistive sensor having a free layer above a substrate and forming a soft magnetic layer adapted to control a magnetization direction of the free layer and a magnetic domain of the free layer, wherein a close-packed plane of the soft magnetic layer is positioned parallel or oblique to an ABS of the magnetic head.

Figure 1:
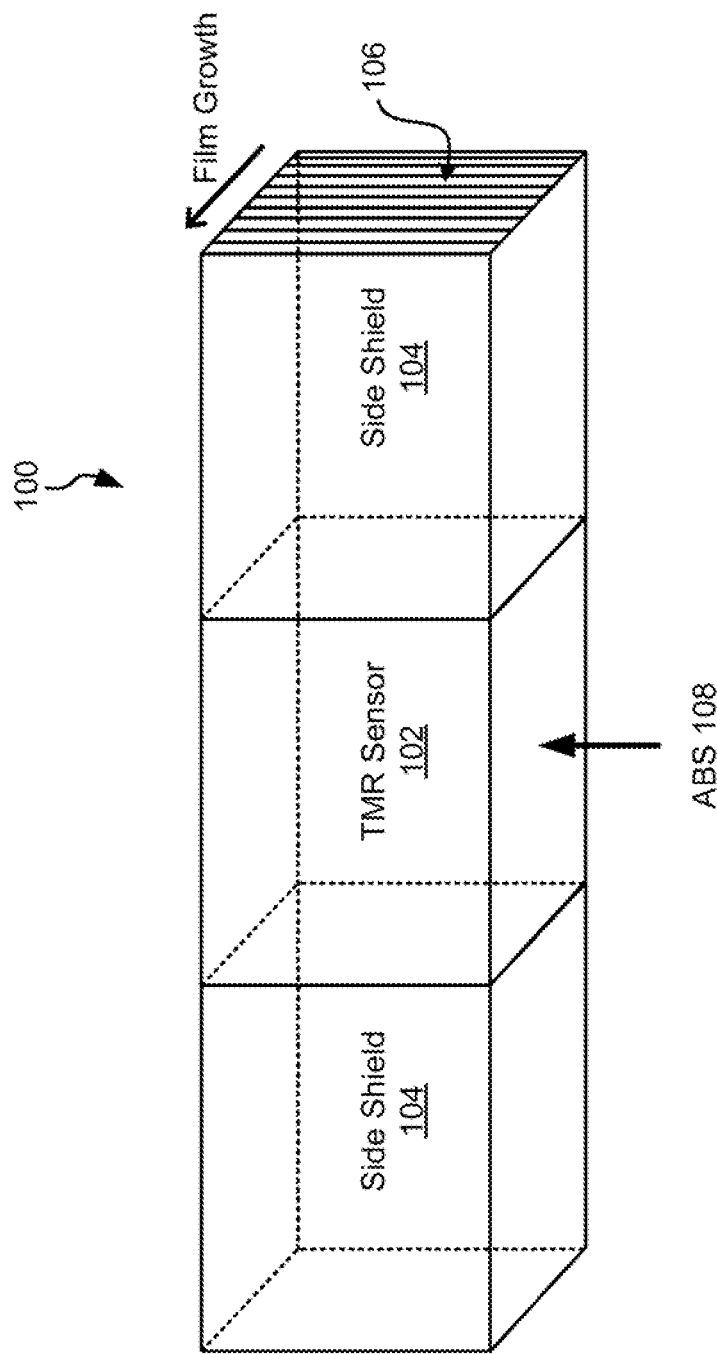
FIG. 1 is a schematic diagram of a conventional structure according to the prior art.
Figure 2A:
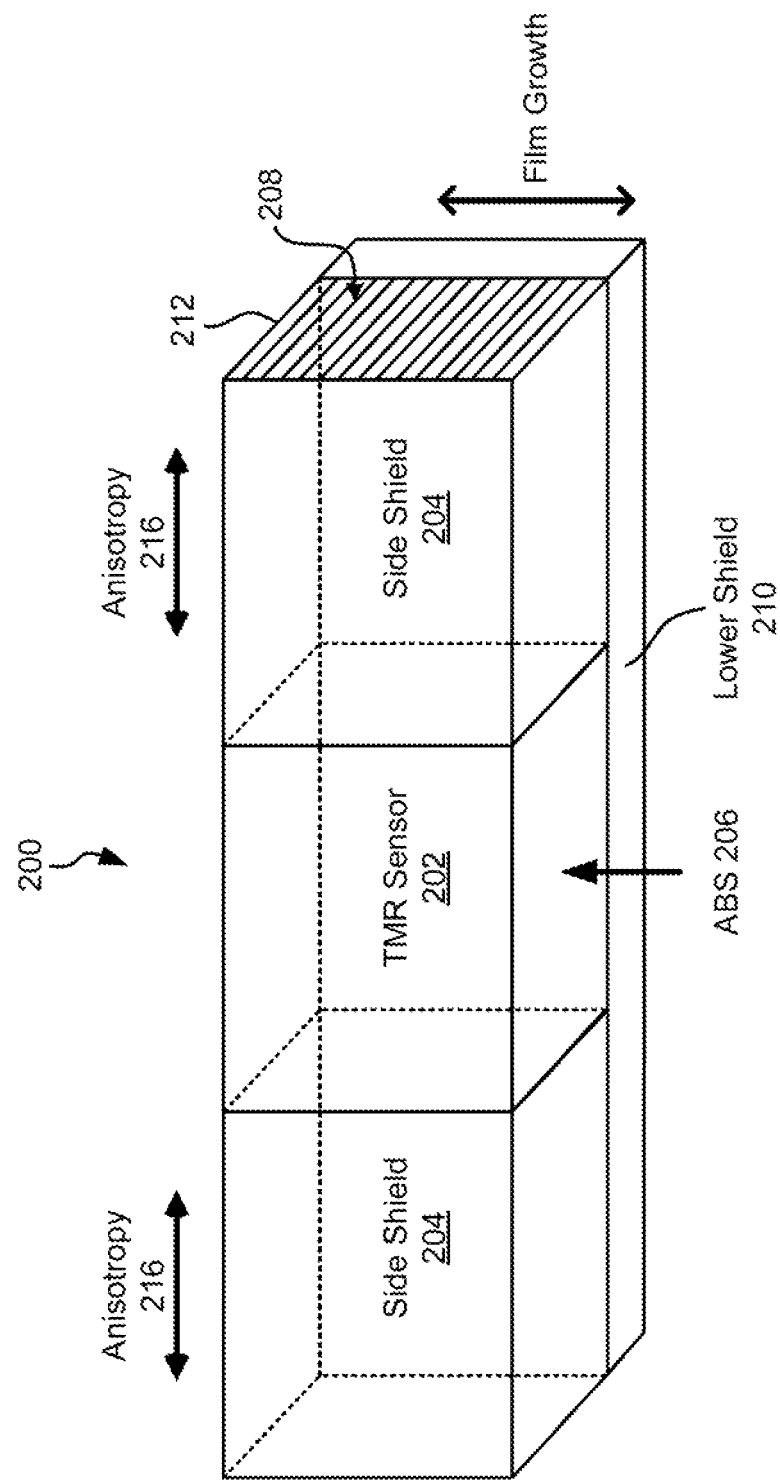
FIG. 2A is a schematic diagram of a tunneling magnetoresistive (TMR) sensor and a side shield according to one embodiment.

According to one embodiment, as shown in FIG. 2A, a structure 200 comprises a tunneling magnetoresistive (TMR) sensor 202 and a side shield 204 positioned on one or both sides of the TMR sensor 202 in a cross-track direction. The cross-track direction is perpendicular or substantially perpendicular to a direction of medium movement across the structure 200 when the structure is being utilized to read and/or write to the medium. The side shield 204 is formed in a direction perpendicular to an ABS 206 of the structure 200 such that a close-packed plane 208 of the side shield 204 is parallel (indicated by line 212) to the ABS 206. The close packed plane 208 is only shown on one side of the side shield 204 to avoid confusion, but the entire side shield 204 is characterized by this close packed plane 208 orientation.

The structure 200 may also comprise a lower shield 210, in some embodiments, which is positioned below at least the TMR sensor 202 in a track movement direction.

In one embodiment, the structure 200 may comprise all or only a portion of a magnetic head, such as when other components are present in the magnetic head and/or multiple structures 200 are present in the magnetic head.

The structure 200 is formed so that shape anisotropy is produced in the direction 216 parallel to the ABS 206. This in turn causes the anisotropic field, Hk, to increase and the bias field exerted on the free layer of the TMR sensor 202 to also be increased. The structure 200 in FIG. 2A is not drawn to scale and the sizes of the individual elements are not to be limiting on the invention described herein.

Figure 2B:
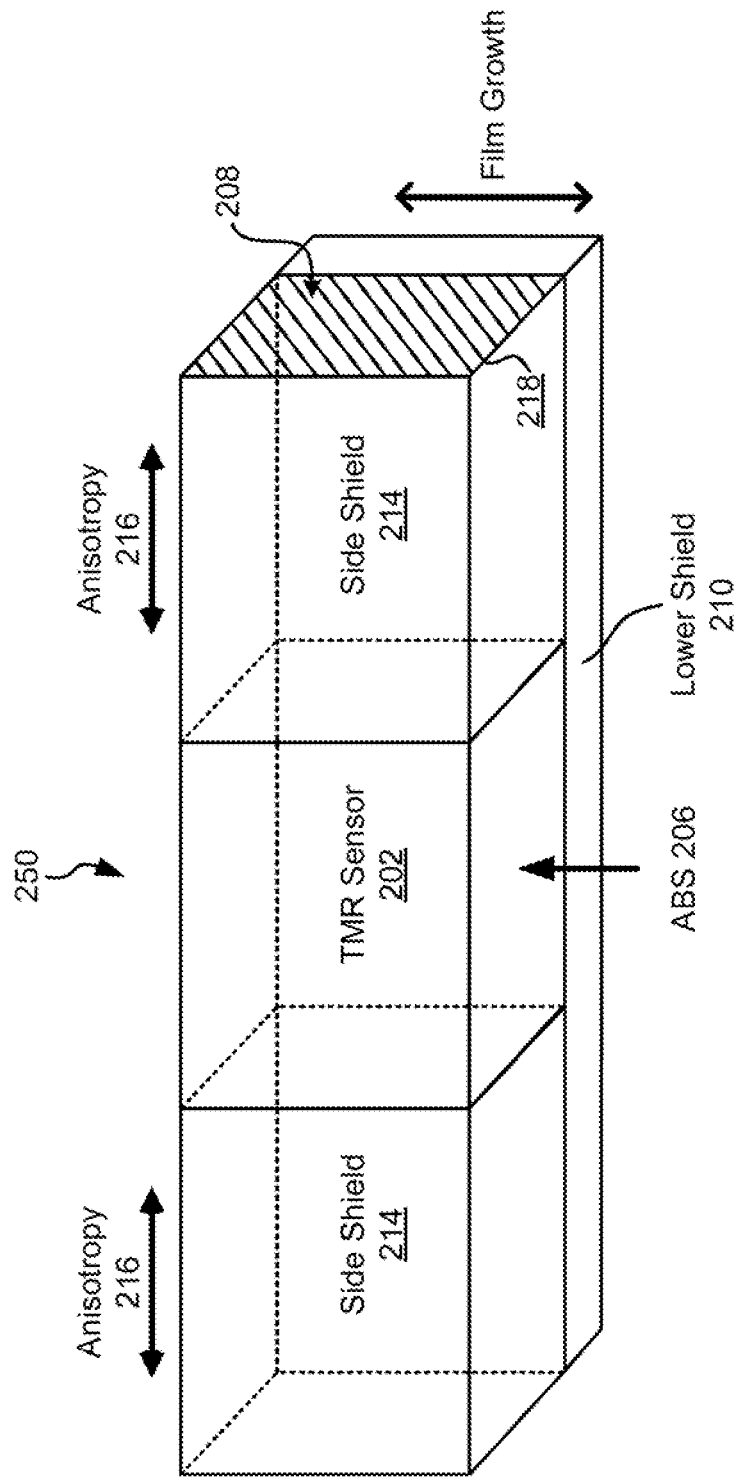
FIG. 2B is a schematic diagram of a tunneling magnetoresistive (TMR) sensor and a side shield according to another embodiment.

In another embodiment, as shown in FIG. 2B, a structure 250 comprises a TMR sensor 202 and a side shield 214 positioned on one or both sides of the TMR sensor 202 in a cross-track direction. The side shield 214 is formed in a direction perpendicular to the ABS 206 of the structure 250 such that a close-packed plane 208 (as indicated by the striation lines) of the side shield 214 is oblique (indicated by line 218) to the ABS 206. The close packed plane 208 is only shown on one side of the side shield 214 to avoid confusion, but the entire side shield 214 is characterized by this close packed plane 208 orientation.

The structure 250 may also comprise a lower shield 210, in some embodiments.

In one embodiment, the structure 250 may comprise all or only a portion of a magnetic head, such as when other components are present in the magnetic head and/or multiple structures 250 are present in the magnetic head.

The structure 250 is formed so that shape anisotropy is produced in the direction 216 parallel to the ABS 206. This in turn causes the anisotropic field, Hk, to increase and the bias field exerted on the free layer of the TMR sensor 202 to also be increased. The structure 250 in FIG. 2B is not drawn to scale and the sizes of the individual elements are not to be limiting on the invention described herein.

Accordingly, as shown in FIGS. 2A-2B according to alternate embodiments, the side shield 204, 214 may be formed in the direction perpendicular to the ABS 206 of the structure 200, 250 such that a close-packed plane 208 (as indicated by the striation lines) of the side shield 204, 214 is parallel (indicated by line 212) or oblique (indicated by line 218) to the ABS 206. However, in both cases, the structure 200, 250 is formed so that shape anisotropy is produced in the direction 216 parallel to the ABS 206. This in turn causes the anisotropic field, Hk, to increase and the bias field exerted on the free layer of the TMR sensor 202 to also be increased.

Figure 3:
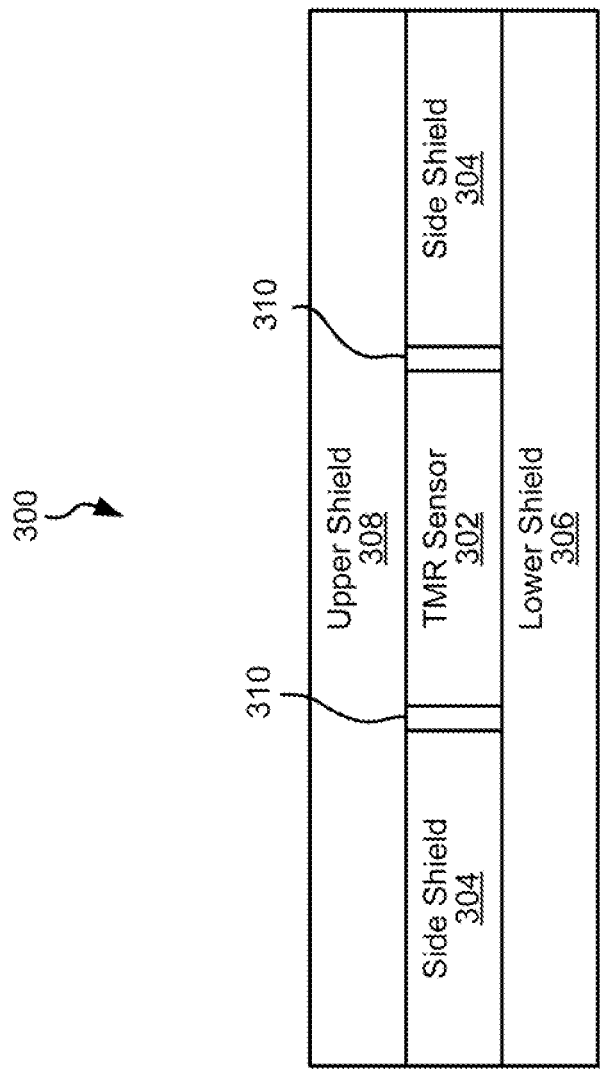
FIG. 3 is a schematic diagram of a magnetic head according to one embodiment.

In one exemplary embodiment, with reference to FIG. 3, a structure 300, such as a magnetic head, was produced according to the following description. A TMR sensor 302 was formed above a lower shield 306. A resist (not shown, since it is later removed) was then formed above the TMR sensor 302 in a track direction (perpendicular to the cross-track direction and parallel to the ABS which is the perspective of FIG. 3, e.g., the view of FIG. 3 is from the ABS), and material was removed up to the lower shield 306, such as via milling, etching, etc. After this, an insulating layer 310 comprising a dielectric and/or an insulating material (such as $Al_2O_3$, MgO, etc.) was formed thereon in order to isolate the TMR sensor 302 from the side shields (not yet formed).

Figure 4:
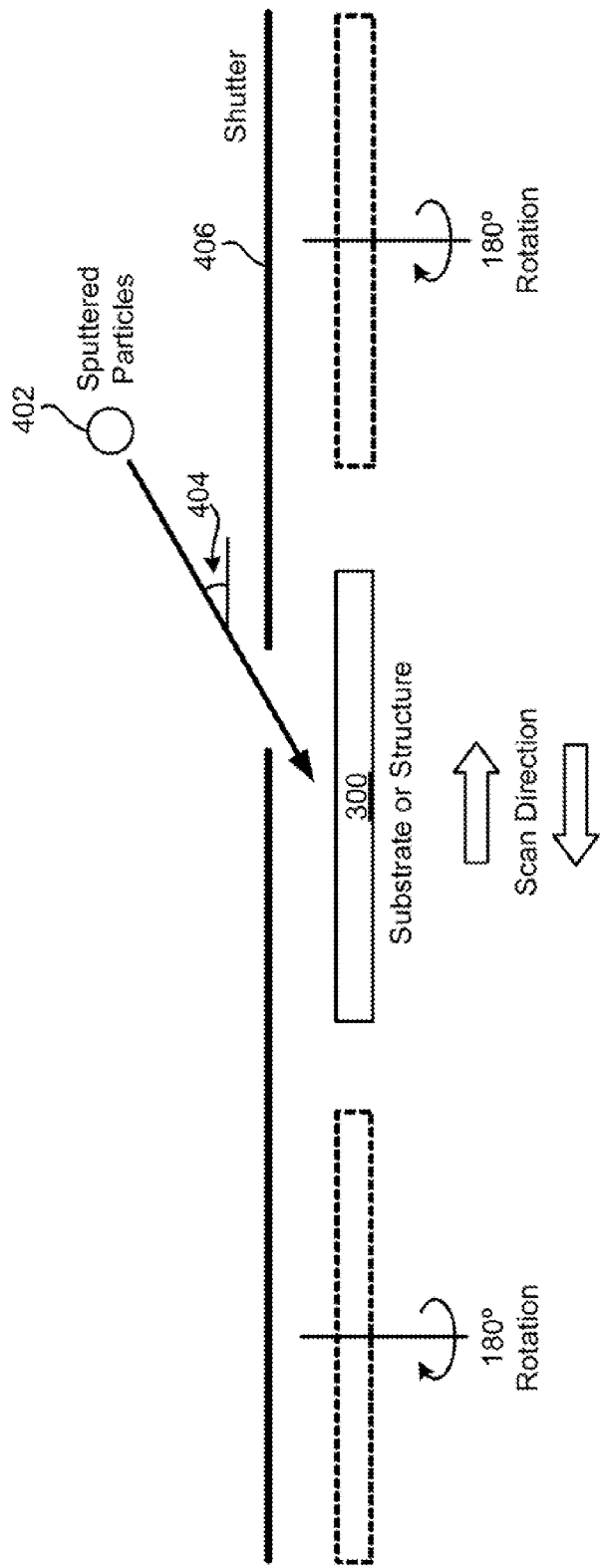
FIG. 4 is a diagram of a soft magnetic layer formation technique, according to one embodiment.

Now referring to FIGS. 3-4, after the insulating layer 310 was formed, sputtered particles 402 were introduced from an oblique angle 404 while the structure 300 was scanned in a direction perpendicular to the eventually formed ABS of the structure 300. A shutter 406 was used to direct the angle of the sputtered particles 402, but any suitable method of directing the particles 402 may be used as known in the art. In this way, a soft magnetic layer (comprising a soft magnetic material, e.g., a material characterized by high values of magnetic permeability-initial permeability from about $10^2$ to about $10^5$, and/or a maximum permeability of about $10^3$ to about $10^6$) was formed on one or both sides of the TMR sensor 302 in the cross-track direction and above the lower shield 306 in the track direction in order to form the side shield 304. In this process, the structure 300 was rotated 180° after scanning in one direction, then rotated back 180° to scan in the opposite direction, in order to improve film thickness distribution of the side shield 304.

In various embodiments, the soft magnetic material of the side shield 304 may comprise a nickel-based alloy, such as NiFe, NiMoFe, NiCrFe, NiCuMoFe, and other alloys of Ni and Fe, a cobalt-based alloy such as CoFe, CoPtFe, CoCrFe, CoMoFe, and other alloys of Co and Fe, Fe—Al, Fe—SiAl, and other alloys of Fe and Al, etc.

Referring again to FIG. 3, after this side shield 304 formation, the resist was removed and an upper shield 308 was formed above the TMR sensor 302 and/or side shield 304 in the track direction. In one embodiment, the upper shield 308 may be formed only above some or all portions of the TMR sensor 302. In other embodiments, the upper shield 308 may be formed above all of the TMR sensor 302 and portions or all of the side shield 304 on one or both sides of the TMR sensor 302.

Figure 5:
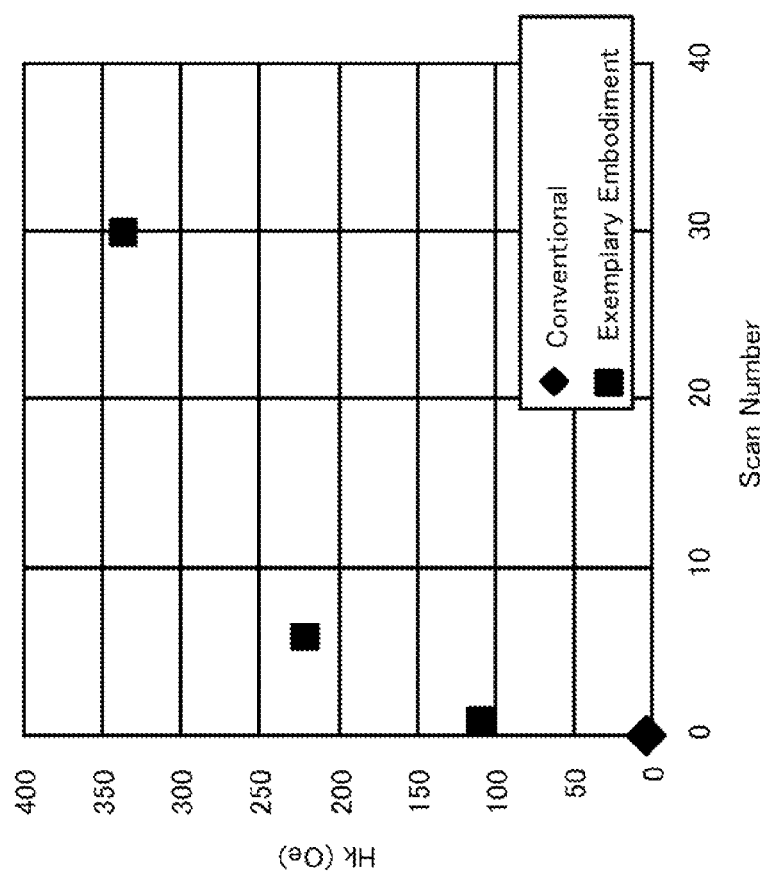
FIG. 5 shows an anisotropic field, Hk, when a number of scans was varied for a structure formed according to an exemplary embodiment.

A magnetic head was produced according to the abovementioned exemplary embodiment, and the bias field which is produced during operation of the magnetic head was evaluated. NiFe alloy was used for the soft magnetic layer that formed the side shield. FIG. 5 shows the anisotropic field, Hk, when the number of scans (scan number) was varied. It is clear from FIG. 5 that Hk is related and possibly dependent on the scan number. When the scan number was increased, Hk increased from about 3 Oe to about 336 Oe. An increase in the anisotropic field, Hk, is desirable for improved magnetic head performance.

Figure 6:
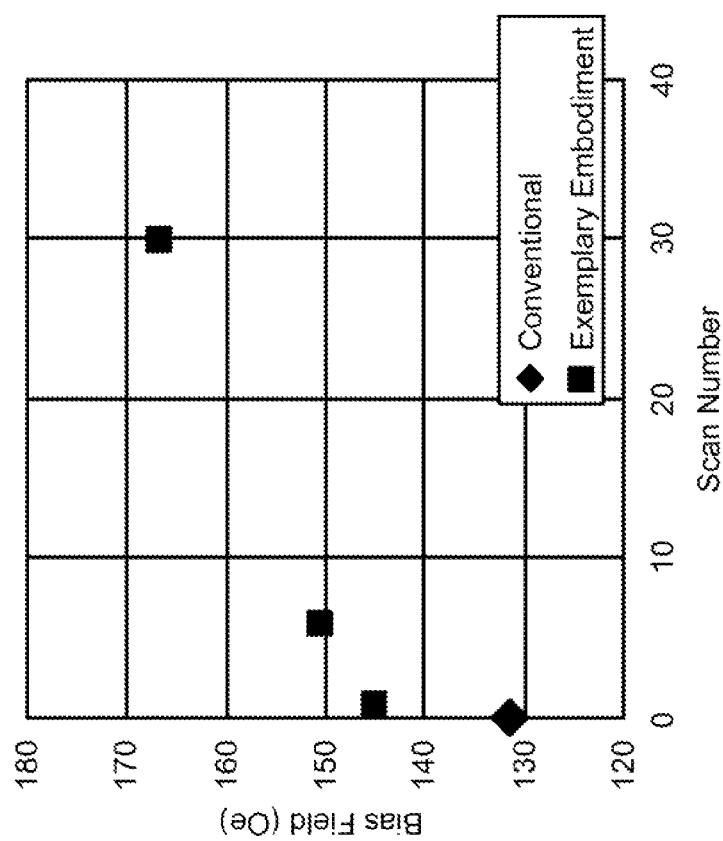
FIG. 6 shows a bias field when a number of scans was varied for a structure formed according to an exemplary embodiment.

FIG. 6 shows the bias field when the scan number was varied. It is clear from FIG. 6 that the bias field is also related to and possibly dependent on the scan number. When the scan number was increased, the bias field increased from about 132 Oe to about 167 Oe. An increase in the bias field is desirable for improved magnetic head performance.

The abovementioned exemplary embodiment relates to the side shield of a read head, but the embodiments and approaches described herein may be used for a side shield of a write head and/or a combination write/read head, as would be understood by one of skill in the art.

Figure 7:
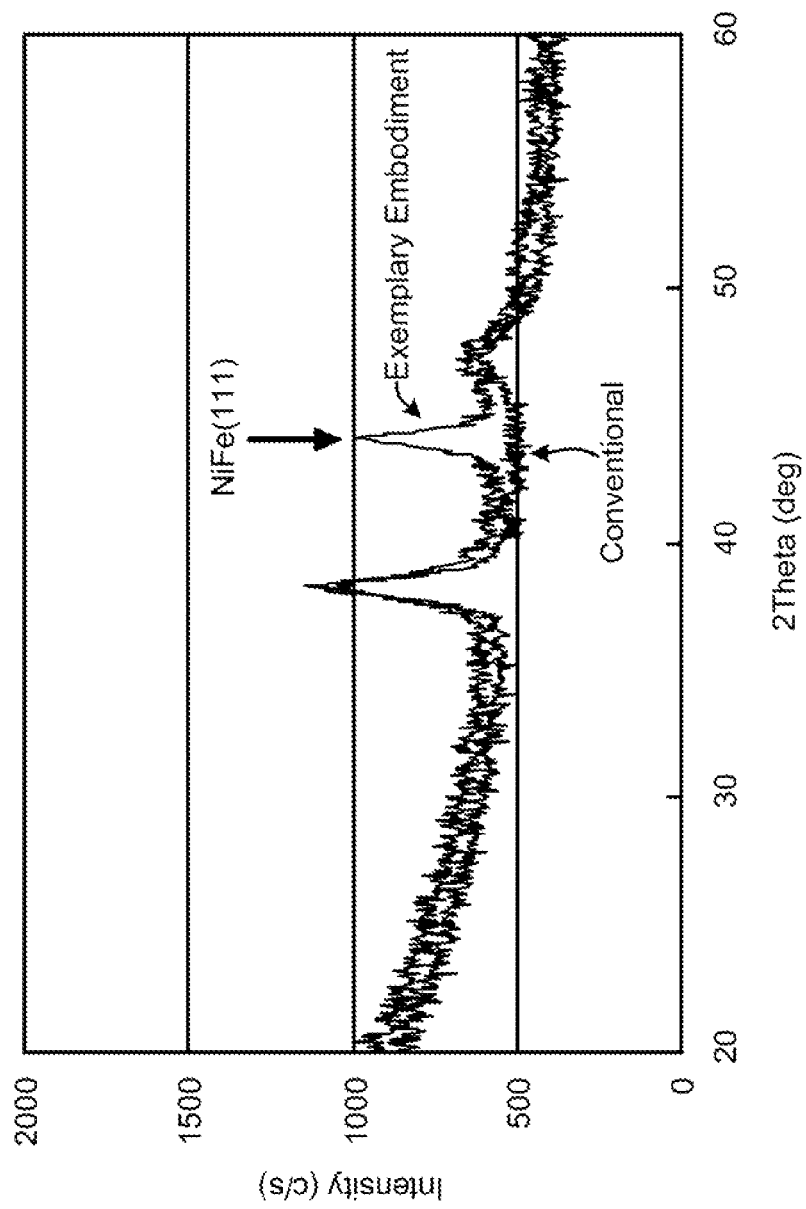
FIG. 7 is a plot of an in-plane X-ray diffraction (XRD) of a NiFe (111) crystal plane of a NiFe soft magnetic layer in accordance with a structure formed according to an exemplary embodiment and a conventional structure.

Now referring to FIG. 7, an in-plane X-ray diffraction (XRD) of a NiFe (111) crystal plane of the NiFe soft magnetic layer (side shield) is plotted in accordance with the above-mentioned exemplary embodiment and a conventional structure. An NiFe (111) peak is not apparent in the conventional structure, whereas as an NiFe (111) peak is very apparent in the exemplary embodiment. This NiFe (111) peak is indicative of a structure in which the NiFe (111) crystal plane is parallel or oblique to the ABS. Therefore, according to these results, conventional structures do not have an NiFe (111) crystal plane that is parallel or oblique to the ABS, whereas the exemplary embodiment and others described herein do have an NiFe (111) crystal plane that is parallel or oblique to the ABS.

Furthermore, a considerable effect is achieved when the inclination of the NiFe (111) plane from the ABS is about 20°. Therefore, according to various embodiments, the oblique angle of the formation of the side shield may be from about 0° to about 20° and/or from about 160° to about 180° in order to achieve this effect.

Figure 8:
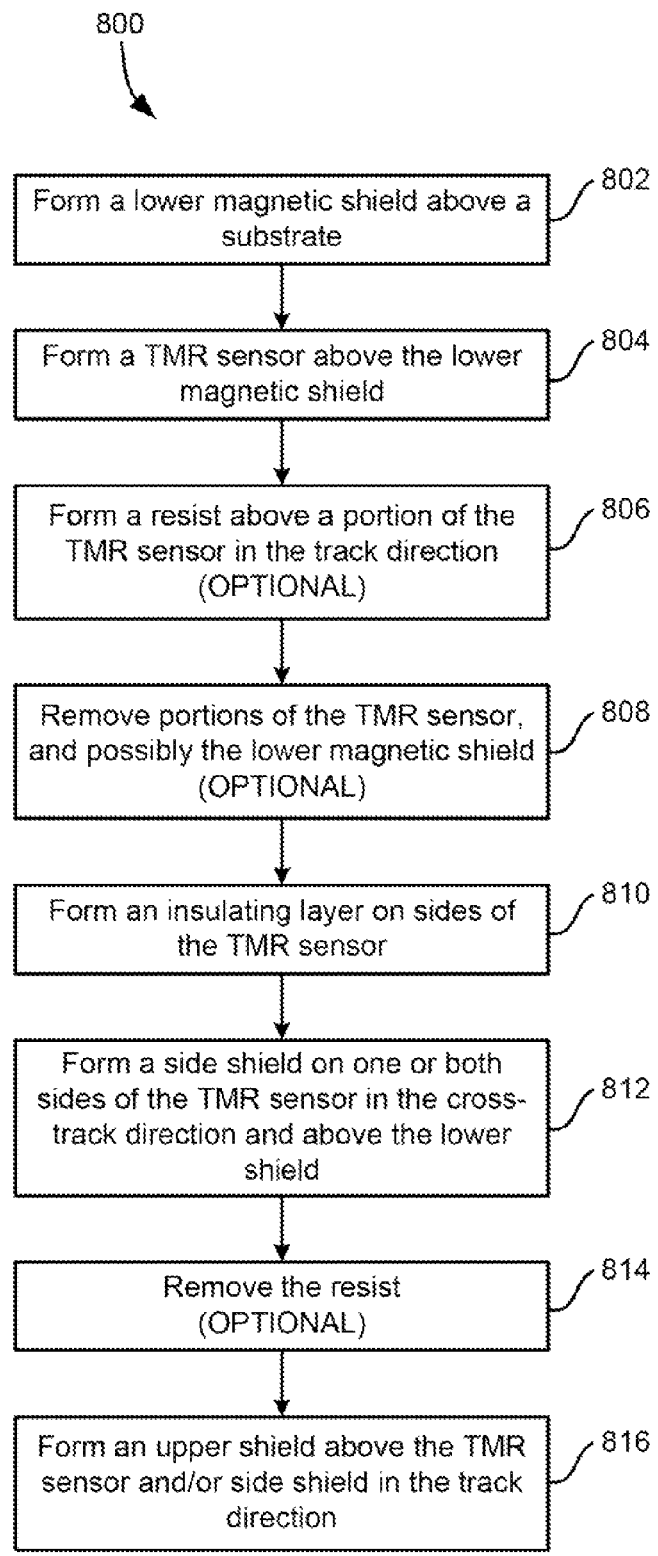
FIG. 8 is a flowchart of a method according to one embodiment.

Now referring to FIG. 8, a method 800 for forming a magnetic head is shown according to one embodiment. The method 800 may be performed in accordance with the present invention in any of the environments depicted in FIGS. 2-7, among others, in various embodiments. Of course, more or less operations than those specifically described in FIG. 8 may be included in method 800, as would be understood by one of skill in the art upon reading the present descriptions.

Any formation technique may be used to form any of the layers, structures, films, and other components of method 800 described herein, such as sputtering, plating, spin coating, chemical vapor deposition (CVD), atomic layer deposition (ALD), physical vapor deposition (PVD), etc.

Furthermore, any magnetic material may be used to form the lower magnetic shield, such as ferromagnetic materials, paramagnetic materials, soft magnetic materials, hard magnetic materials, etc., and/or alloys thereof. For example, materials selected from Fe alloys of one or more of Co, Ni, Cr, B, Si, C, P, Mo, Nb, V, Mn, and Ge may be used as the shield material for any shield formed in method 800.

The method 800 may begin with operation 802, where a lower magnetic shield is formed above a substrate. The substrate may comprise any magnetic or nonmagnetic material, such as glass, silicon, silicon dioxide, aluminum dioxide, germanium, etc.

In operation 804, a TMR sensor is formed above the lower magnetic shield. The TMR sensor may be formed as known by one of skill in the art, and may include multiple layers in addition to a free layer, such as a magnetic tunnel junction (MTJ) structure having a tunnel barrier layer and ferromagnetic electrodes, a pinned layer (which forms a spin-valve structure with the free layer), etc.

In one embodiment, the TMR sensor is formed without needing any etching or removal steps. In an alternate embodiment, the TMR sensor may be formed full film or on a portion of the substrate which is greater than the portion on which it will reside after a removal process is performed, with additional portions intended to be removed to ultimately form the TMR sensor.

In optional operation 806, a resist is formed above a portion of the TMR sensor in the track direction, the resist being formed above the portion of the TMR sensor which is to remain after material removal. The resist may comprise any suitable material as known in the art. The resist is not formed over any portion of the substrate.

In optional operation 808, portions of the TMR sensor (and possibly the lower magnetic shield) are removed using any technique known in the art, such as etching, milling, etc.

In operation 810, an insulating layer is formed on sides of the TMR sensor. Any suitable insulating material may be used, such as a dielectric and/or an insulating material (such as $SiO_2$, $Al_2O_3$, MgO, etc.) or other magnetically or electrically insulating material known in the art.

In operation 812, a side shield is formed on one or both sides of the TMR sensor in the cross-track direction and above the lower shield. The side shield may be formed by sputtering particles from an oblique angle while the substrate is scanned in a direction perpendicular to the eventually formed ABS of the magnetic head. A shutter may be used to direct the angle of the sputtered particles, but any suitable method of directing the particles may be used as known in the art.

The side shield may comprise a soft magnetic material (e.g., a material characterized by high values of magnetic permeability-initial permeability from about $10^2$ to about $10^5$, and/or a maximum permeability of about $10^3$ to about $10^6$). In this process, the substrate is rotated 180° after scanning in one direction, then rotated back 180° to scan in the opposite direction, in order to improve film thickness distribution of the side shield.

That is to say that the side shield may be formed by sputtering particles from an oblique angle while the substrate is scanned in a first direction perpendicular to the ABS of the magnetic head, with the substrate being rotated 180° after scanning in the first direction, then rotated back 180° to scan in a second direction that is opposite to the first direction until the side shield is fully formed.

In various embodiments, the soft magnetic material of the side shield may comprise a nickel-based alloy, such as NiFe, NiMoFe, NiCrFe, NiCuMoFe, and other alloys of Ni and Fe, a cobalt-based alloy such as CoFe, CoPtFe, CoCrFe, CoMoFe, and other alloys of Co and Fe, Fe—Al, Fe—SiAl, and other alloys of Fe and Al, etc.

In optional operation 814, after side shield formation, the resist is removed using any technique known in the art, such as liftoff, mechanical stripping, chemical mechanical planarization (CMP), ashing, chemical stripping, etc.

In operation 816, an upper shield is formed above the TMR sensor and/or side shield in the track direction. In one embodiment, the upper shield may be formed only above some or all portions of the TMR sensor. In other embodiments, the upper shield may be formed above all of the TMR sensor and portions or all of the side shield on one or both sides of the TMR sensor.

Figure 9:
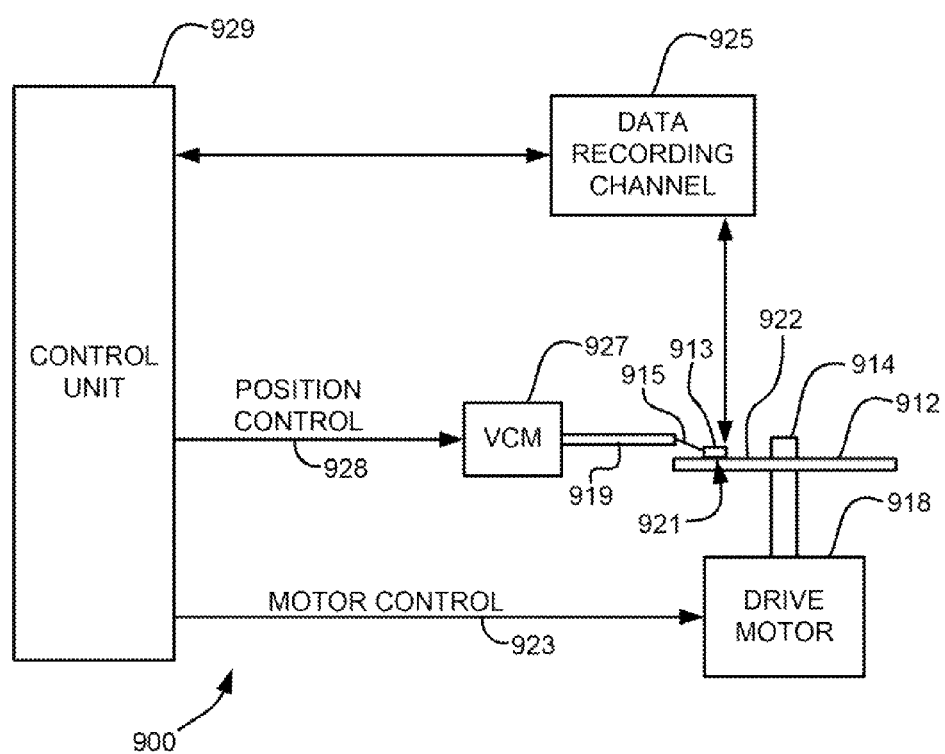
FIG. 9 is a simplified drawing of a magnetic recording disk drive system.

Referring now to FIG. 9, there is shown a disk drive 900 in accordance with one embodiment of the present invention. As shown in FIG. 9, at least one rotatable magnetic medium (e.g., magnetic disk) 912 is supported on a spindle 914 and rotated by a drive mechanism, which may include a disk drive motor 918. The magnetic recording on each disk is typically in the form of an annular pattern of concentric data tracks (not shown) on the disk 912. Thus, the disk drive motor 918 preferably passes the magnetic disk 912 over the magnetic read/write portions 921, described immediately below.

At least one slider 913 is positioned near the disk 912, each slider 913 supporting one or more magnetic read/write portions 921, e.g., of a magnetic head according to any of the approaches described and/or suggested herein. As the disk rotates, slider 913 is moved radially in and out over disk surface 922 so that portions 921 may access different tracks of the disk where desired data are recorded and/or to be written. Each slider 913 is attached to an actuator arm 919 by means of a suspension 915. The suspension 915 provides a slight spring force which biases slider 913 against the disk surface 922. Each actuator arm 919 is attached to an actuator 927. The actuator 927 as shown in FIG. 9 may be a voice coil motor (VCM). The VCM comprises a coil movable within a fixed magnetic field, the direction and speed of the coil movements being controlled by the motor current signals supplied by controller 929.

During operation of the disk storage system, the rotation of disk 912 generates an air bearing between slider 913 and disk surface 922 which exerts an upward force or lift on the slider. The air bearing thus counter-balances the slight spring force of suspension 915 and supports slider 913 off and slightly above the disk surface by a small, substantially constant spacing during normal operation. Note that in some embodiments, the slider 913 may slide along the disk surface 922.

The various components of the disk storage system are controlled in operation by control signals generated by controller 929, such as access control signals and internal clock signals. Typically, control unit 929 comprises logic control circuits, storage (e.g., memory), and a microprocessor. In a preferred approach, the control unit 929 is electrically coupled (e.g., via wire, cable, line, etc.) to the one or more magnetic read/write portions 921, for controlling operation thereof. The control unit 929 generates control signals to control various system operations such as drive motor control signals on line 923 and head position and seek control signals on line 928. The control signals on line 928 provide the desired current profiles to optimally move and position slider 913 to the desired data track on disk 912. Read and write signals are communicated to and from read/write portions 921 by way of recording channel 925.

The above description of a typical magnetic disk storage system, and the accompanying illustration of FIG. 9 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising
   a magnetoresistive sensor comprising a free layer; and
   a soft magnetic layer configured to control a magnetization direction of the free layer and a magnetic domain of the free layer,
   wherein a close-packed plane of the soft magnetic layer is oriented parallel to an air bearing surface (ABS) of the magnetic head, and
   wherein the soft magnetic layer produces shape anisotropy in a direction parallel to the ABS due to the orientation of the close-packed plane.

2. The magnetic head as recited in claim 1, wherein the soft magnetic layer comprises NiFe.

3. The magnetic head as recited in claim 2, wherein the close-packed plane is an NiFe (111) plane.

4. The magnetic head as recited in claim 1, wherein the magnetoresistive sensor is a tunneling magnetoresistive (TMR) sensor comprising a spin valve structure, and wherein the soft magnetic layer is a side shield positioned on one or both sides of the TMR sensor in a cross-track direction.

5. The magnetic head as recited in claim 4, further comprising:
   a lower shield positioned below at least the TMR sensor;
   an upper shield positioned above at least the TMR sensor; and
   an insulating layer positioned on sides of the TMR sensor in the cross-track direction.

6. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

7. A magnetic head, comprising:
   a magnetoresistive sensor comprising a free layer; and
   a soft magnetic layer configured to control a magnetization direction of the free layer and a magnetic domain of the free layer,
   wherein a close-packed plane of the soft magnetic layer is oriented oblique to an air bearing surface (ABS) of the magnetic head, and
   wherein the soft magnetic layer produces shape anisotropy in a direction parallel to the ABS due to the orientation of the close-packed plane.

8. The magnetic head as recited in claim 7, wherein the soft magnetic layer comprises NiFe.

9. The magnetic head as recited in claim 8, wherein the close-packed plane is an NiFe (111) plane.

10. The magnetic head as claimed in claim 9, wherein an inclination of the NiFe (111) plane with respective to the ABS is about 20°.

11. The magnetic head as claimed in claim 10, wherein the inclination of the NiFe (111) plane with respective to the ABS is from about 0° to about 20° and/or from about 160° to about 180°.

12. The magnetic head as recited in claim 7, wherein the magnetoresistive sensor is a tunneling magnetoresistive (TMR) sensor comprising a spin valve structure, and wherein the soft magnetic layer is a side shield positioned on one or both sides of the TMR sensor in a cross-track direction.

13. The magnetic head as recited in claim 12, further comprising:
   a lower shield positioned below at least the TMR sensor;
   an upper shield positioned above at least the TMR sensor; and
   an insulating layer positioned on sides of the TMR sensor in the cross-track direction.

14. A magnetic data storage system, comprising:
   at least one magnetic head as recited in claim 7;
   a magnetic medium;
   a drive mechanism for passing the magnetic medium over the at least one magnetic head; and
   a controller electrically coupled to the at least one magnetic head for controlling operation of the at least one magnetic head.

15. A method for forming a magnetic head, the method comprising
   forming a magnetoresistive sensor comprising a free layer above a substrate; and
   forming a soft magnetic layer adapted to control a magnetization direction of the free layer and a magnetic domain of the free layer, wherein a close-packed plane of the soft magnetic layer is positioned parallel or oblique to an air bearing surface (ABS) of the magnetic head.

16. The method as recited in claim 15, wherein the soft magnetic layer comprises NiFe.

17. The method as recited in claim 16, wherein the close-packed plane is an NiFe (111) plane.

18. The method as claimed in claim 17, wherein an inclination of the NiFe (111) plane with respective to the ABS is from about 0° to about 20° and/or from about 160° to about 180°.

19. The method as recited in claim 15, wherein the magnetoresistive sensor is a tunneling magnetoresistive (TMR) sensor comprising a spin valve structure, and wherein the soft magnetic layer is a side shield positioned on one or both sides of the TMR sensor in a cross-track direction.

20. The method as recited in claim 19, further comprising:
forming a lower shield below at least the TMR sensor and above the substrate;
forming an upper shield above at least the TMR sensor; and
forming an insulating layer on sides of the TMR sensor in the cross-track direction.

21. The method as recited in claim 15, wherein the forming the soft magnetic layer comprises sputtering particles from an oblique angle while the substrate is scanned in a first direction perpendicular to an air bearing surface (ABS) of the magnetic head, wherein the substrate is rotated 180° after scanning in the first direction, then rotated back 180° to scan in a second direction that is opposite to the first direction, wherein the close-packed plane of the soft magnetic layer is congruent with a plane of formation of the soft magnetic layer, and wherein the plane of formation of the soft magnetic layer is not oriented perpendicular to the ABS.

22. The method as recited in claim 21, wherein a shutter is used to direct the oblique angle of the sputtered particles.

23. The method as recited in claim 15, wherein the soft magnetic layer produces shape anisotropy in a direction parallel to the ABS due to an orientation of the close-packed plane parallel or oblique to the ABS of the magnetic head.

24. The magnetic head as recited in claim 1, wherein the close-packed plane of the soft magnetic layer coincides with a plane of formation of the soft magnetic layer, and wherein the plane of formation of the soft magnetic layer is not oriented perpendicular to the ABS.

25. The magnetic head as recited in claim 7, wherein the close-packed plane of the soft magnetic layer coincides with a plane of formation of the soft magnetic layer, and wherein the plane of formation of the soft magnetic layer is not oriented perpendicular to the ABS.

* * * * *